(12) United States Patent
Jaenecke et al.

(10) Patent No.: US 7,386,060 B2
(45) Date of Patent: Jun. 10, 2008

(54) METHOD OF REDUCING A PEAK-TO-AVERAGE POWER RATIO

(75) Inventors: Peter Jaenecke, Straubenhardt (DE); Thomas Loewel, Berlin (DE)

(73) Assignee: ALCATEL, Paris (FR)

( * ) Notice: Subject to any disclaimer, the term of this patent is extended or adjusted under 35 U.S.C. 154(b) by 651 days.

(21) Appl. No.: 10/780,745

(22) Filed: Feb. 19, 2004

(65) Prior Publication Data
US 2004/0179468 A1 Sep. 16, 2004

(30) Foreign Application Priority Data
Mar. 11, 2003 (EP) ................................. 03290602

(51) Int. Cl.
*H04K 1/02* (2006.01)
(52) U.S. Cl. ............... 375/296; 375/222; 375/295; 375/285; 375/299; 375/296; 375/260; 375/130; 375/316; 375/297; 455/114.3; 455/67.11; 455/103; 455/126
(58) Field of Classification Search ............. 375/297, 375/300, 295, 222, 285, 299, 296, 260, 130, 375/316; 455/67.11, 114.3, 103, 126
See application file for complete search history.

(56) References Cited

U.S. PATENT DOCUMENTS

| 6,130,918 | A   | * | 10/2000 | Humphrey et al. ........ 375/295 |
| 6,175,551 | B1  |   | 1/2001  | Awater |
| 6,853,632 | B1  | * | 2/2005  | Verma et al. ............ 370/343 |
| 2002/0101936 | A1 | | 8/2002 | Peregrym |
| 2004/0203430 | A1 | * | 10/2004 | Morris ............... 455/67.11 |
| 2006/0029158 | A1 | * | 2/2006 | Lipka et al. ........... 375/300 |

FOREIGN PATENT DOCUMENTS

EP    1 195 962 A2    4/2002

* cited by examiner

Primary Examiner—Shuwang Liu
Assistant Examiner—Kabir A Timory
(74) Attorney, Agent, or Firm—Sughrue Mion, PLLC

(57) ABSTRACT

The present invention relates to a method of reducing a peak-to-average power ratio of a signal to be transmitted. The method comprises the steps of detecting a portion of the signal being above a clipping threshold level, decomposing the portion of the signal into a number of functions, the number of functions being proportional to a duration of the portion of the signal, performing the number of soft-clippings on the signal by means of a reference function, the positions of the soft-clippings being given by the positions of the functions and the respective scalings of the reference function being determined by the amplitudes of the functions.

4 Claims, 4 Drawing Sheets

METHOD OF REDUCING A PEAK-TO-AVERAGE POWER RATIO

This invention is based on a priority application EP 03 290 602.6 which is hereby incorporated by reference.

FIELD OF THE INVENTION

The present invention relates generally to a system and method for transmitting digital signals, and more particularly without limitation to clipping techniques for reduction of the peak-to-average power ratio of multi-carrier multiplexed signals, such Orthogonal Code Division Multiplex (OCDM), or Orthogonal Frequency Division Multiplex (OFDM) signals.

BACKGROUND OF THE INVENTION

A large peak-to-average power ratio reduces the efficiency of a transmission power amplifier. In particular this is a problem for multi-carrier multiplexed signals such as OCDM and OFDM signals as for such signals the maximum possible peak power is much larger than the average transmitted power.

U.S. Pat. No. 6,175,551 shows a method for reduction of the peak-to-average power ratio by means of soft-clipping. Soft-clipping means that a scaled reference function is subtracted from the sampled signal, such that each subtracted reference function reduces the peak power of at least one signal sample. Preferably the reference function has approximately or exactly the same bandwidth as the transmitted signal. In this way it is assured that the peak power reduction does not cause any out-off band interference. One example of a suitable reference signal is a sinc function.

A common disadvantage of prior art soft-clipping methods is that the subtraction of the reference function from the over shooting signal portion can result in multiple maxima. This problem of the prior art is illustrated by making references to FIGS. 1 to 3:

FIG. 1 shows the magnitude signal 100 of an I,Q signal to be transmitted. Signal 100 has portions which are above clipping threshold 102. Those portions of signal 100 respective peaks are detected and marked by peak markers 104 to 114.

FIG. 2 shows reference signal 116 in the time domain. Scaled reference signal 116 is subtracted from the I and Q components of signal 100 at the peak locations which are identified by peak markers 104 to 114. The result of this soft-clipping operation is shown in FIG. 3 where magnitude signal 118 is the clipped signal.

For example, the first peak of signal 100 which is identified by peak marker 104 is transformed into two new peaks 120 and 122 of signal 118. Likewise a large number of new peaks is created in the signal portion consisting of the peaks identified by peak markers 108 to 114. Hence additional soft-clipping iterations are required to interatively bring signal 100 to clipping threshold 102.

Therefore the present invention aims to provide an improved method of reducing a peak-to-average power ratio of a signal to be transmitted for improved soft-clipping.

SUMMARY OF THE INVENTION

The present invention provides for a method of reducing a peak-to-average power ratio of a signal to be transmitted by decomposing portions of the signal which are above a clipping threshold level into elementary functions. The elementary functions provide the locations and the amplitudes for soft-clipping of the original signal. This enables to substantially reduce the number of iterations which are required for the soft-clipping.

In accordance with a preferred embodiment of the invention only a single soft-clipping step is performed on the decomposed portions of the signal completely avoiding multiple soft-clipping iterations.

In accordance with a further preferred embodiment of the invention, symmetric functions are used for decomposing of the signal portions, such as gaussian or triangle functions.

In accordance with a further preferred embodiment of the invention only the amplitudes and the positions of the functions are parameterised for decomposing of the portions of the signal which are above the clipping threshold level. This reduces the computational complexity of the decomposition process.

In accordance with a further preferred embodiment of the invention only a single type of elementary function is used for decomposing of the signal portions.

It is to be noted that the present invention can be used for any sender, such as an end-user telecommunication device, a transmitter, such as a base station of a wireless cellular telecommunication network and other telecommunication applications.

BRIEF DESCRIPTION OF THE DRAWINGS

In the following preferred embodiments of the invention will be described in greater detail by making reference to the drawings, in which.

DETAILED DESCRIPTION

Figure 4:
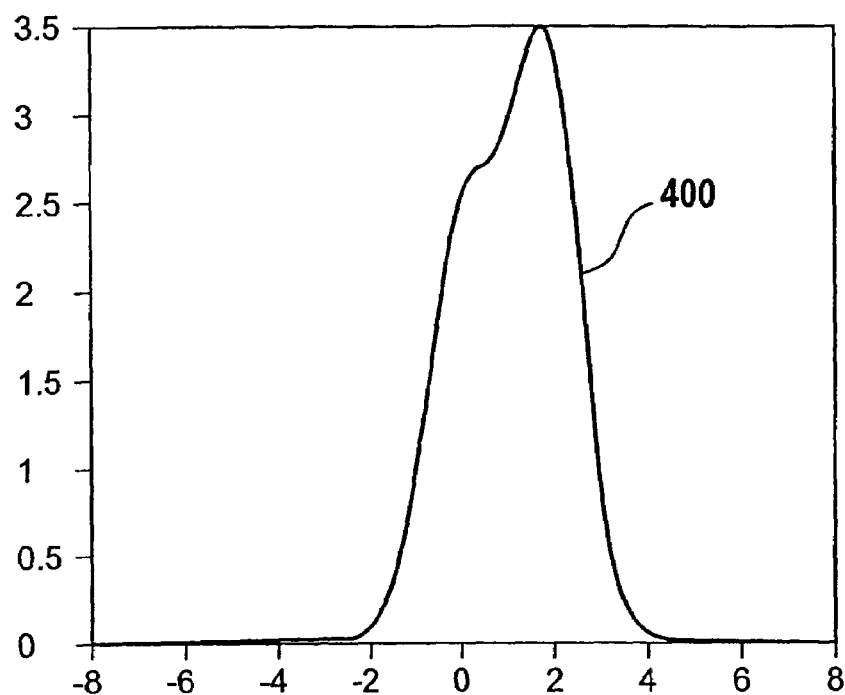
FIG. 4 shows an example of a portion of a signal to be transmitted which is above the clipping threshold.

FIG. 4 shows peak 400 of a signal to be transmitted in the time domain. Peak 400 is a magnitude signal and is above a clipping threshold level.

Figure 1:
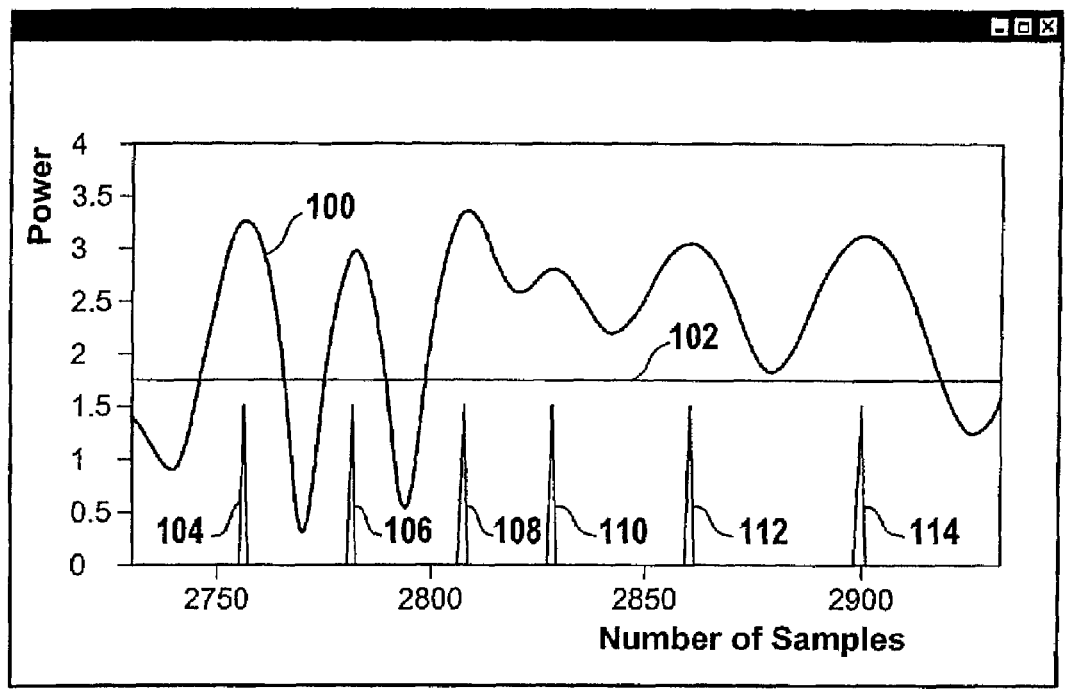
FIG. 1 shows a signal which has portions above a clipping threshold.
Figure 2:
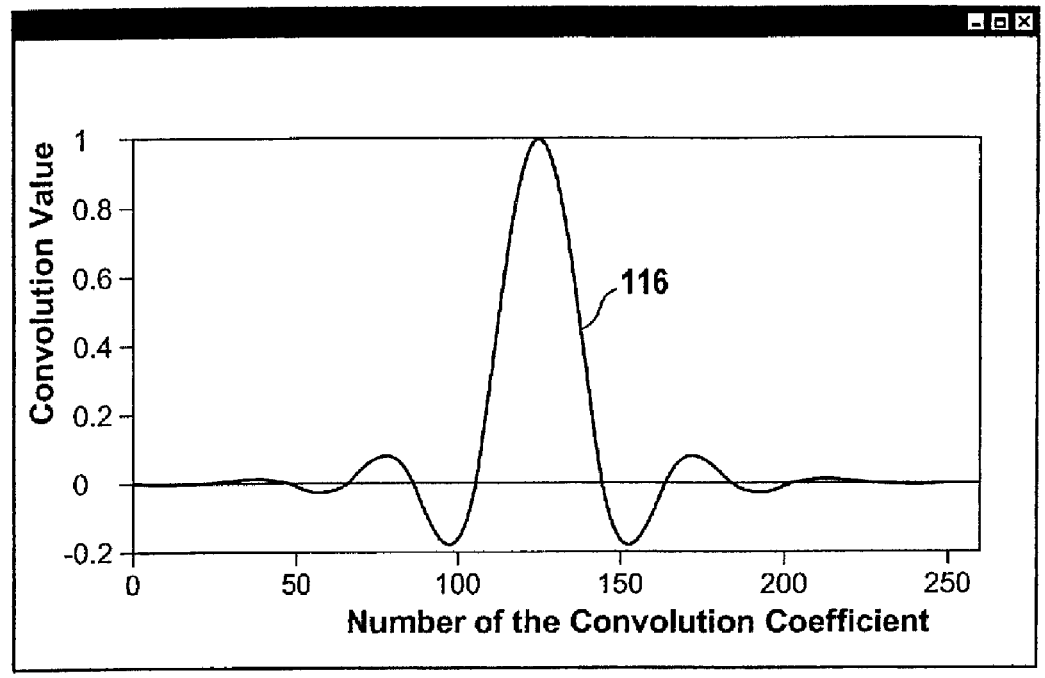
FIG. 2 shows a reference function for performing soft-clipping.
Figure 3:
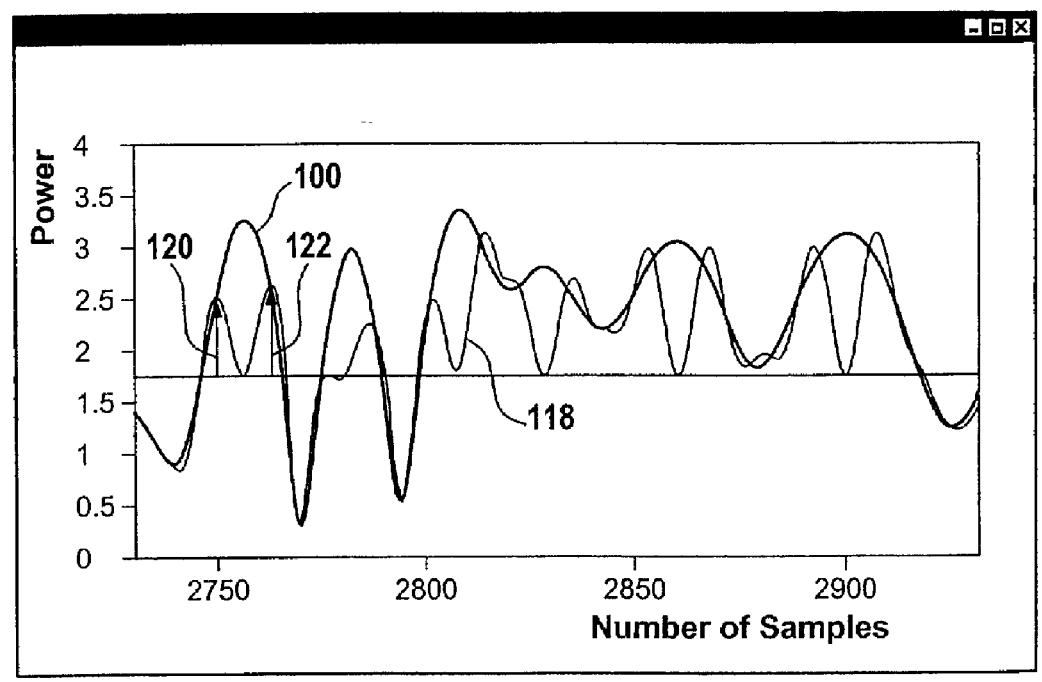
FIG. 3 shows the signal of FIG. 1 after performing one iteration of soft-clipping by means of the reference function of FIG. 2.

Peak 400 is decomposed into gaussian functions 500, 502 and 504. The number of the gaussian functions which is used to perform the decomposition is chosen in proportion to the duration of peak 400. To perform the soft-clipping a reference function, such as the function shown in FIG. 2, is used.

The positions for subtracting of the reference function are given by the positions of the elementary functions into which the peak 400 is decomposed. The scaling of the reference function at those positions is determined by the amplitudes of the corresponding elementary functions. This way only one or a small number of iterations are required to bring peak 400 to the clipping threshold.

In more general terms a peak P of a signal to be transmitted which is above the clipping threshold level is developed as a sum of elementary functions f:

$$P = \sum_{i=1}^{N} f(x_i, A_i)$$

where N is the number of elementary functions which is proportional to the duration of the peak P, $x_i$ the position of the maxima of the elementary functions and $A_i$ the amplitudes at the positions of the maxima $x_i$.

For example a gaussian function can be used as elementary function f or another symmetric function, such as a triangle function.

Figure 5:
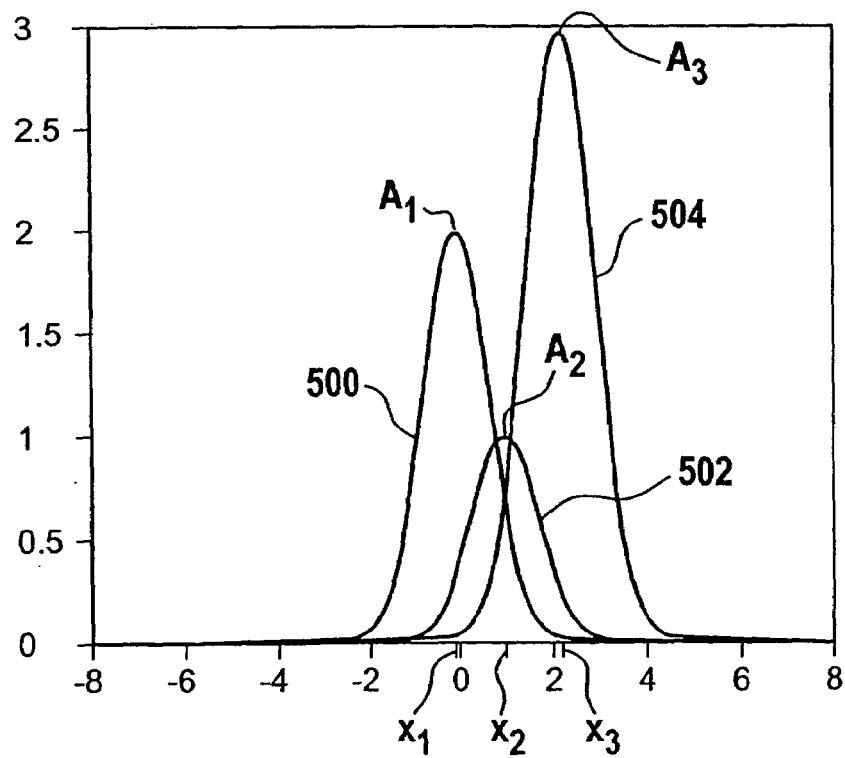
FIG. 5 shows the decomposition of the signal of FIG. 4 into elementary gaussian functions.

In the example shown in FIG. 5 a gaussian function is used as elementary function f. The first gaussian function 500 which is used for the decomposition of peak P is positioned at $x_1$ and has amplitude $A_1$; gaussian function 502 is positioned at $x_2$ and has amplitude $A_2$; gaussian function 504 is positioned at $x_3$ and has amplitude $A_3$. The number N is equal to 3 in the example considered here as a number of 3 elementary functions is used for the decomposition.

Hence, soft-clippings are performed at positions $x_1$, $x_2$, $x_3$. For the soft-clipping on position $x_1$ the reference function is scaled in proportion to the amplitude $A_1$. Likewise, for the soft-clipping on position $x_2$ the reference function is scaled in proportion to the amplitude $A_2$, etc.

In general, the decomposition of the peak P into a number of N elementary functions can be performed by means of mathematical methods which are as such known. For example the decomposition can be performed by finding a minimum for $$\left[P - \sum_{i=1}^{N} f(x_i, A_i)\right]^2$$

Alternatively the absolute value, i.e.

$$\left|P - \sum_{i=1}^{N} f(x_i, A_i)\right|$$

can be used.

An example for a mathematical method which can be used for performing the decomposition is the gradient method.

Figure 6:
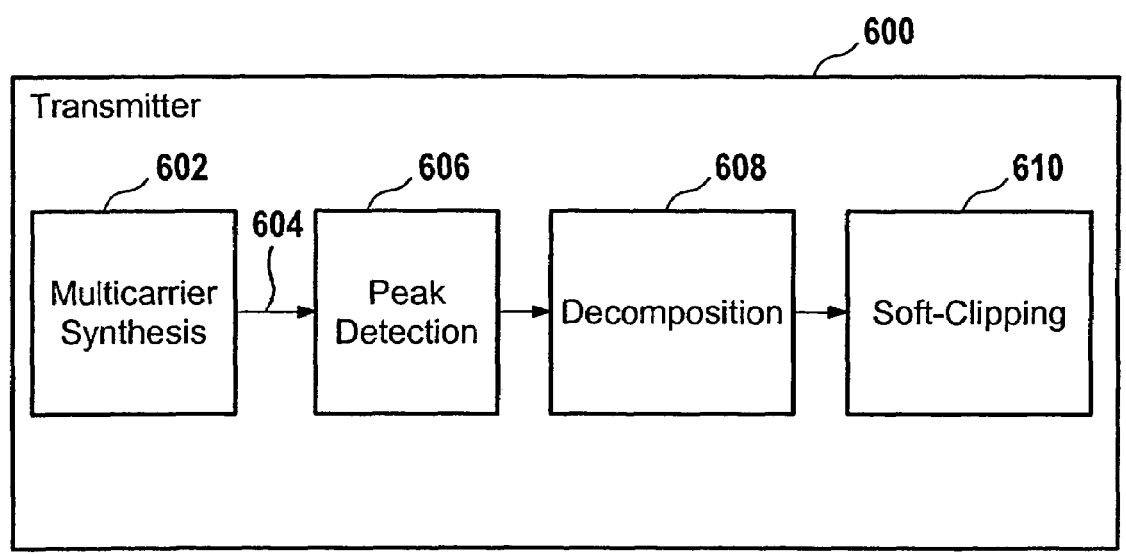
FIG. 6 shows a portion of a block diagram of a transmitter.

FIG. 6 shows a portion of a block diagram of transmitter 600. Transmitter 600 has multi-carrier synthesis module 602 to provide a multi-carrier multiplexed signal 604, such as an OFDM or OCDM signal.

Further transmitter 600 has peak detection module 606 which outputs those portions of signal 604 which are above a clipping threshold level. These peaks are provided from peak detection module 606 to peak decomposition module 608, where the peaks are decomposed into elementary functions as explained above. The result of the peak decomposition is provided from peak decomposition module 608 to soft-clipping module 610. In soft-clipping module 610 a reference function is subtracted from the peak at the positions of the elementary functions; the respective scalings of the reference function are determined by the amplitudes of the elementary functions. The resulting soft-clipped signal is then sent out by transmitter 600 over an air-interface or a cable connection.

LIST OF REFERENCE NUMERALS 100 signal
102 clipping threshold
104 peak markers
106 peak markers
108 peak markers
110 peak markers
112 peak markers
114 peak markers
116 reference signal
118 signal
120 peak
122 peak
400 peak
500 gaussian function
502 gaussian function
504 gaussian function
600 transmitter
602 multi carrier synthesis module
604 signal
606 peak detection module
608 peak decomposition module
610 soft-clipping module

What is claimed is:

1. A method of reducing a peak-to-average power ratio of a signal to be transmitted, the method comprising:
    detecting a portion of the signal being above a clipping threshold level,
    decomposing the portion of the signal being above the clipping threshold level into a number of symmetric elementary functions, each with a single maximum, the number of functions being proportional to a duration of the portion of the signal, and
    performing soft-clippings of the portion of the signal being above the clipping threshold level by using a scaled reference function which is subtracted from each of the elementary functions into which the portion of the signal being above the clipping threshold level is decomposed and such that the subtracted elementary functions reduce a peak power of said portion of the signal being above the clipping threshold level of the signal to be transmitted,
    wherein positions for subtracting the scaled reference function from each of the elementary functions and the scaling of the reference function are given respectively by a position of a maximum and an amplitude at the maximum of the corresponding elementary functions, such that the position of the maximum of each of the elementary functions and the corresponding amplitude at the maximum of each of the elementary functions provide locations and amplitudes for the soft-clipping of the portion of the signal being above the clipping threshold level.

2. The method of claim 1, further comprising determining parameters for the elementary functions by determining an amplitude value and a position value for each of the function.

3. The method of claim 1, wherein the decomposing comprises minimising $$\left[P - \sum_{i=1}^{N} f(x_i, A_i)\right]^2$$

-continued or $$\left| P - \sum_{i=1}^{N} f(x_i, A_i) \right|$$

where
- N is the number of functions f which is proportional to the duration of the peak P,
- $x_i$ is the position of function f,
- $A_i$ is the amplitude of function f
- P is the portion of the signal above clipping threshold level.

4. An electronic circuit for reducing a peak-to-average power ratio of a signal to be transmitted, the electronic circuit comprising:
   a detector which detects a portion of the signal being above the clipping threshold level above a clipping threshold level,
   a decomposing unit which decomposes the portion of the signal of the signal being above the clipping threshold level into a number of symmetric elementary functions each with a single maximum, wherein the number of elementary functions is proportional to a duration of the portion of the signal being above the clipping threshold level,
   a soft-clipping unit which performs soft-clipping of the portion of the signal being above the clipping threshold level using a scaled reference function which is subtracted from each of the elementary functions into which the portion of the signal being above the clipping threshold level is decomposed and such that the subtracted elementary functions reduce the peak power of the portion of the signal being above the clipping threshold level of the signal to be transmitted, wherein the position for subtracting the scaled reference function from each of the elementary functions and the scaling of the reference function is given respectively by the position of the maximum and the amplitude at he maximum of the corresponding elementary function, such that the position of the maximum of each of the elementary functions and the corresponding amplitude at the maximum provide the locations and the amplitudes for the soft-clipping of the portion of the signal above the clipping threshold level.

* * * * *